P. G. ZIMMERMANN.
LANDING GEAR FOR AEROPLANES.
APPLICATION FILED DEC. 22, 1916.

1,298,625.

Patented Mar. 25, 1919.
3 SHEETS—SHEET 1.

Inventor
PAUL G. ZIMMERMANN.

By

Attorney

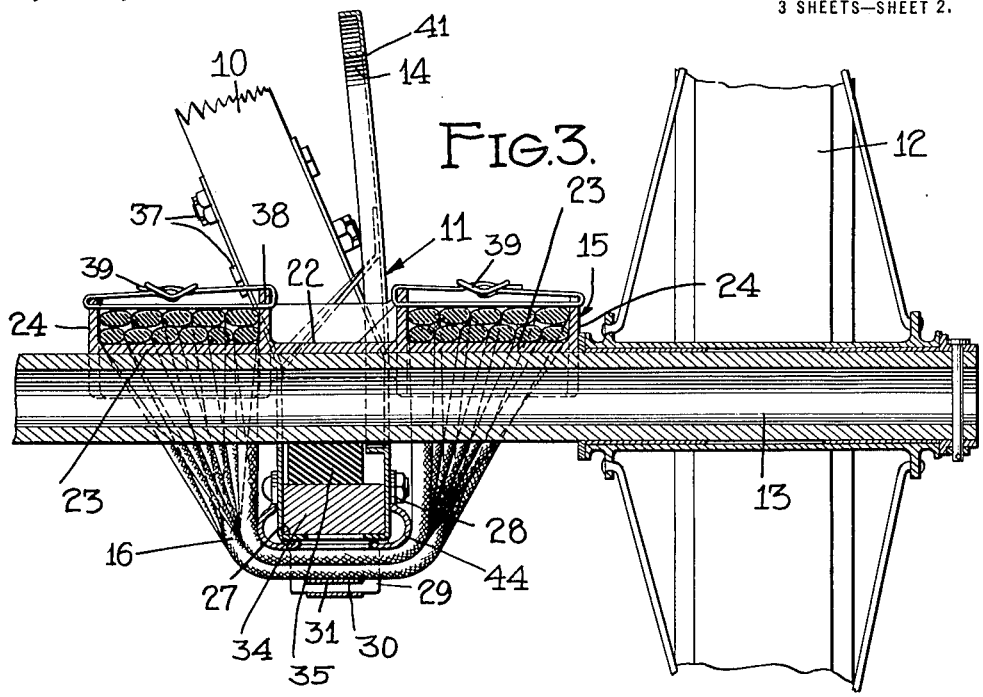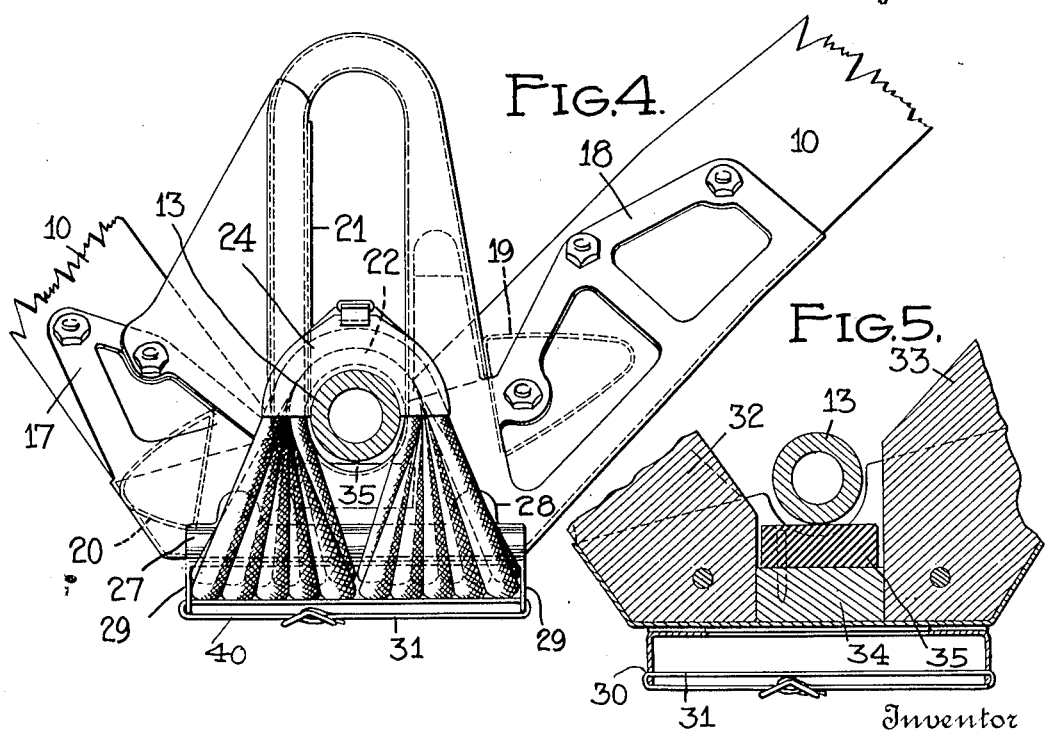

P. G. ZIMMERMANN.
LANDING GEAR FOR AEROPLANES.
APPLICATION FILED DEC. 22, 1916.
1,298,625.
Patented Mar. 25, 1919.
3 SHEETS—SHEET 3.
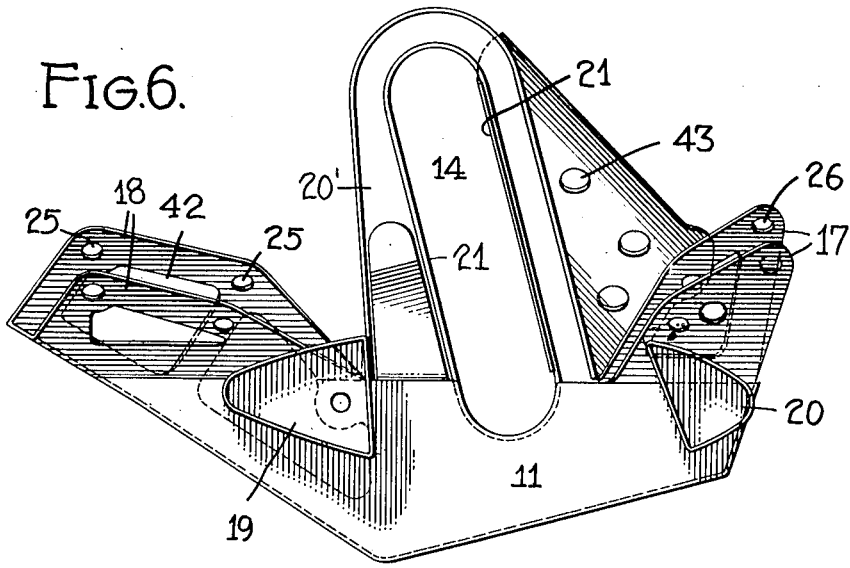
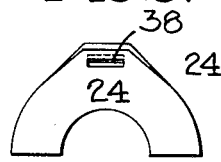
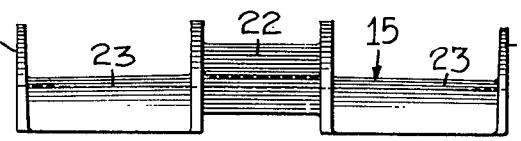
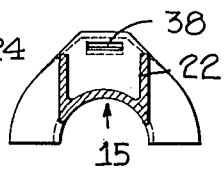
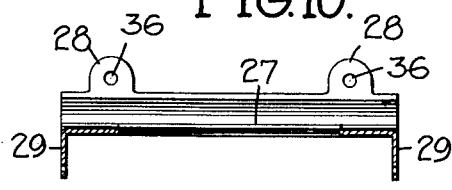
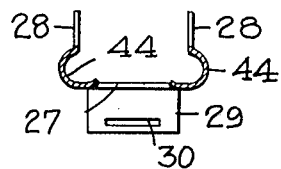
Inventor
PAUL G. ZIMMERMANN.
By John P. Tarbox
Attorney

UNITED STATES PATENT OFFICE.

PAUL G. ZIMMERMANN, OF BUFFALO, NEW YORK, ASSIGNOR TO CURTISS AEROPLANE AND MOTOR CORPORATION, A CORPORATION OF NEW YORK.

LANDING-GEAR FOR AEROPLANES.

1,298,625.   Specification of Letters Patent.   Patented Mar. 25, 1919.

Application filed December 22, 1916. Serial No. 138,501.

*To all whom it may concern:*

Be it known that I, PAUL G. ZIMMERMANN, a citizen of the United States, residing at Buffalo, in the county of Erie and State of New York, have invented certain new and useful Improvements in Landing-Gear for Aeroplanes, of which the following is a specification.

My invention relates in general to aircraft and more particularly to a landing gear therefor. It has for its object the supporting of the craft when resting or running on the ground and the adequate absorption of the shocks incident to grounding or alighting.

Heretofore, types of landing gears and shock absorbers used have not only been extremely heavy but they have also offered a large amount of head resistance to the flight of the craft through the air. My invention overcomes the above mentioned objections by providing a light and strong V-type landing gear which is so constructed that it presents a minimum of head resistance due to the fact that it is composed of few parts all of which are of substantially streamline form. The construction and principal features are pointed out in the specification.

Of the drawings in which like numerals of reference designate like or similar parts, Figure 1 is a side elevation of the landing gear;

Fig. 3 is a partial longitudinal sectional view;

Fig. 4 is an enlarged detail view showing the shock absorbing mechanism;

Fig. 5 is a partial sectional view showing the strut arrangement at the intersection of the struts;

Fig. 6 is a perspective view showing a fitting used in connection with my landing gear;

Figs. 7, 8 and 9 are side elevation, end elevation and lateral section respectively of a guide and support;

Figs. 10 and 11 are longitudinal and lateral sections respectively of a cap for the underneath landing gear structure.

Figure 1:
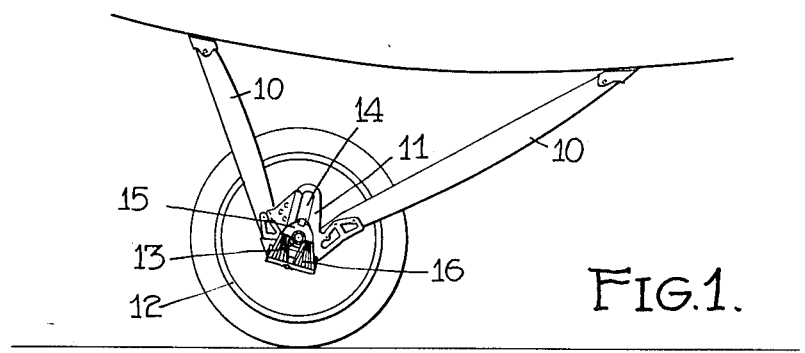

In Fig. 1, the struts which form the supporting portion of the landing gear are designated 10. The clip 11 which is shown in detail in Fig. 6 is arranged to receive and retain the lower extremities of the struts 10 in such manner as to form a rigid structure therewith. The landing gear wheels 12 are supported on an axle 13 which is carried within a slot or aperture 14 formed within the clip 11. The saddle 15 is carried on the top side of the axle 13 and the elastics or rubbers 16 are laced over the top of the saddle 15 and underneath the bottom portion of the clip 11. By this arrangement the axle is permitted a limited degree of vertical movement within the slot 14 due to the stretching of the elastics 16.

Figure 2:
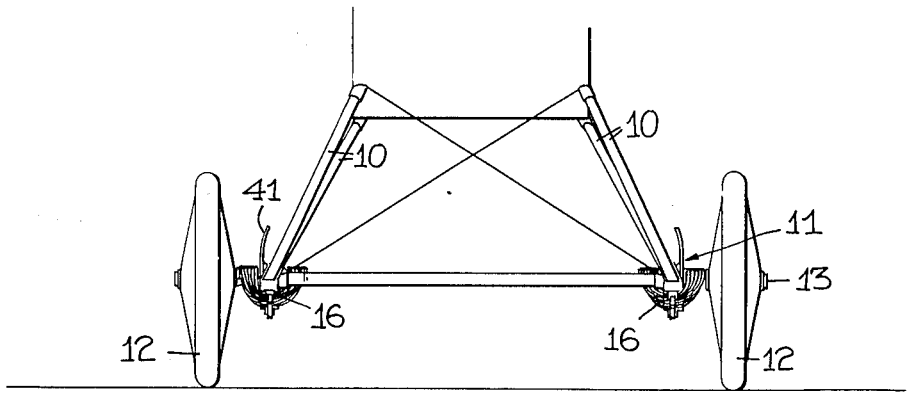
Fig. 2 is a front elevation of the landing gear.

In Fig. 6 the clip wholly designated as 11 comprises a pair of ears 17 arranged to engage the forward landing gear struts and a pair of ears 18 arranged to engage the rearward landing gear struts. Attached to the body portion 11 of the clip are sockets or bearings 19 and 20 arranged to receive and engage the fairing which is used to streamline the axle 13. The vertically extended portion 20' of the clip is provided with a slot 14, the interior of which is provided with lateral bearing surfaces 21 formed by flanging outwardly or inwardly the metal comprising the clip. These flanged bearing portions 21 serve as guides for the saddle 15. The angularly extending pairs of ears 17 and 18 are provided with holes or apertures 26 and 25 through which are passed retaining bolts which hold the ears in engagement with the landing gear struts 10. In Fig. 2 it will be noticed that the upwardly extending body portions 41 of the clip are preferably curved inwardly at their topmost extremities. This construction permits of a limited amount of radial travel of the saddle 15 within the guides 21 should impact in landing come to one wheel only. The clip as an entirety is preferably formed of sheet metal and such parts thereof as sockets 19 and 20 which cannot readily be integrally formed are welded or brazed to the main body so as to make a practically unified structure. Lightening holes as 42 and 43 are placed wherever possible to dispose of surplus metal and hence reduce the weight of the clip. This factor of lightness is of extreme importance in areo-nautical construction.

In order to cut down the head resistance of the landing gear, fairing strips are carried both fore and aft of the axle 13 by means of the sockets 19 above described.

The fairing not only effectually streamlines the axle but also lends rigidity to the entire landing gear structure.

The saddle 15, Fig. 7, comprises a central bearing portion 22 and two semicylindrical portions 23 and has retaining flanges 24 formed at each of its extremities. The bearing portions 22 engage within the guides 21 of the clip as above. The underneath portion of the saddle 15 is semicircular and is arranged to complement and bear upon the upper side of the axle 13. As shown in Fig. 7, it is preferably cast or forged of some light material in one solid piece.

In Fig. 10, the cap 27 is shown in detail. This cap is arranged to bear upon the underneath portion of the landing gear strut intersection, serving not only as a partial retaining means therefor but also as a bearing surface and retainer for the loops of the elastic 16. It is of substantially channel shape and comprises parallel laterally extending flange portions 28, the general form of which is shown in Fig. 11. The corners of this cap are well rounded as shown at 44 in order to present a proper bearing surface for the loops of the elastic which encircles it. The extremities of the cap are provided with flanges or cheeks 29 which carry slots 30 arranged to receive retaining straps as shown at 31 in Fig. 5.

Referring to Fig. 5, it will be seen that the extremities of the landing gear struts 10 represented by 32 and 33 abut a supporting block 34 to which they are rigidly attached. This block 34 carries on its upper surface a block of rubber or elastic 35 which receives the rebound shocks from the axle 13.

The general arrangement of the shock absorbing device may be clearly understood by reference to Fig. 3 in which it is shown that the elastic supporting bands 16 are laced or wound over the extremities of the saddle 15 around the axle 13 and down underneath the retaining cap 27 from which point they are carried up over the other extremity of the saddle. A plurality of these bands are used, being laced either continuously or in a number of different lengths.

It is thus seen that the downward thrust occasioned by the weight of the machine upon the landing gear struts 10 is carried entirely by the elastic supporting bands 16. In order that the elastics may not work loose or out of their retaining flanges 24, a leather strap or other similar device is threaded through the aperture 38 formed in the flanges and held securely by buckles 39. Similarly, a strap is used to retain the elastics in proper relation to the cap 27 as shown at 40 in Fig. 4. The extent of vertical travel of the axle 13 is limited only by the stretching of the supporting bands 16 since the slot 14 carried in the main body of the clip extends for a sufficient distance above the axle to permit of considerable oscillation of the axle within the slot.

While in the foregoing I have utilized more or less detailed forms of construction in presenting the preferred embodiment of my invention, it is desired to point out that certain constructional changes may be made from time to time without in any way departing from the original spirit of the invention as set forth in the claims.

What is claimed is:

1. In a landing gear for aircraft, the combination of downwardly converging V-arranged struts, a fitting comprising a body portion having its ends socketed and upwardly and divergently extended to receive and join said struts, an axle, and shock absorber elastics laced over said axle and transversely beneath said fitting.

2. A landing gear for aircraft including downwardly converging struts, a fitting adapted to receive and retain said struts, a saddle arranged to operate in sliding engagement with said fitting, a cap carried underneath said fitting and strut intersection, and elastic supporting means extending laterally beneath said cap and upwardly over said saddle at opposite extremities thereof.

3. A landing gear for aircraft including struts and an axle, a saddle bearing upon said axle, a fitting adapted to engage said struts, said fitting being provided with a guide slot through which said saddle extends, and elastic means encircling said fitting and said saddle to permit of relative yielding movement of the axle.

4. An airplane landing gear fitting, including a pair of forwardly extending ears, a pair of rearwardly extending ears, a plurality of laterally extending sockets, and a substantially vertically extending body portion having a guide formed therein.

5. A landing gear for aircraft including struts, and a fitting adapted to engage said struts, said fitting comprising a substantially vertically extending portion having guides formed therein, angularly extending portions arranged to engage said struts, and laterally extending sockets to receive and retain fairing.

6. In combination, a fitting for aircraft landing gear struts, a wheel axle, and a saddle for said axle comprising a central portion having substantially parallel sides engaged by said fitting, end portions of substantially semicylindrical form, a plurality of radial flanges to confine said central and end sections, and an underneath longitudinally extending surface arranged to complement and bear upon said axle.

7. In combination, a fitting for aircraft landing gear struts, a yielding member, and a cap arranged to seat the yielding member comprising an elongated body portion having a substantially flat bottom, semicylindrical side walls with a plurality of ears extending therefrom, and cheeks projecting substantially at right angles to said bottom to engage retaining straps.

8. A landing gear for aircraft including downwardly converging struts, an axle carried above the strut intersection, elastic supporting means, and a cap carried underneath the apex of the strut intersection to form a bearing for said means.

9. A landing-gear fitting for aircraft comprising a body portion having sockets formed thereon respectively intermediately of and adjacent its extremities, the sockets in one instance facing laterally and in the other instance substantially upwardly.

10. A landing-gear for aircraft including a strut fitting having its inner face socketed to receive an interconnection between the landing-gear struts.

11. In a landing-gear for aircraft, downwardly converging struts, an axle, a fitting mounted at the foot of said struts, shock absorber elastics arranged to twice intersect both said axle and said fitting, and separate devices mounted respectively upon the axle and the fitting for holding the elastics against displacement.

12. In a landing-gear for aircraft, downwardly converging struts, an axle, a fitting mounted at the foot of said struts, shock absorber elastics laced for contact with both said axle and said fitting to yieldingly support the craft, and straps bridging the elastics at their respective points of contact with the fitting and the axle.

13. The combination with the V-arranged struts of an aeroplane landing gear, of a socket-fitting, the strut ends being seated in the socket, and angular extensions formed upon the socket to follow the struts, one of the extensions being constructed to engage the strut from beneath.

In testimony whereof I affix my signature

PAUL G. ZIMMERMANN.

Copies of this patent may be obtained for five cents each, by addressing the "Commissioner of Patents, Washington, D. C."